United States Patent [19]
Nygren

[11] Patent Number: 5,434,417
[45] Date of Patent: Jul. 18, 1995

[54] HIGH RESOLUTION ENERGY-SENSITIVE DIGITAL X-RAY

[75] Inventor: David R. Nygren, Berkeley, Calif.

[73] Assignee: The Regents of the University of California, Oakland, Calif.

[21] Appl. No.: 148,151

[22] Filed: Nov. 5, 1993

[51] Int. Cl.$^6$ ................................................ G01T 1/24
[52] U.S. Cl. .......................... 250/370.01; 250/370.09; 250/370.10
[58] Field of Search .......... 250/370.09, 336.1, 370.10, 250/370.01; 257/428, 429, 430; 378/4

[56] References Cited

U.S. PATENT DOCUMENTS

| | | | |
|---|---|---|---|
| 4,794,438 | 12/1988 | Levinson et al. | 257/429 |
| 4,937,453 | 6/1990 | Nelson | 250/370.05 |
| 5,175,754 | 12/1992 | Casey et al. | 378/4 |

FOREIGN PATENT DOCUMENTS

| | | | |
|---|---|---|---|
| 3633998 | 4/1988 | Germany | 257/430 |
| 55-144576 | 11/1980 | Japan | 250/370.01 |

*Primary Examiner*—Constantine Hannaher
*Assistant Examiner*—Edward J. Glick
*Attorney, Agent, or Firm*—Paul R. Martin; Patrick T. King; John P. Wagner, Jr.

[57] ABSTRACT

An apparatus and method for detecting an x-ray and for determining the depth of penetration of an x-ray into a semiconductor strip detector. In one embodiment, a semiconductor strip detector formed of semiconductor material is disposed in an edge-on orientation towards an x-ray source such that x-rays From the x-ray source are incident upon and substantially perpendicular to the front edge of the semiconductor strip detector. The semiconductor strip detector is formed of a plurality of segments. The segments are coupled together in a collinear arrangement such that the semiconductor strip detector has a length great enough such that substantially all of the x-rays incident on the front edge of the semiconductor strip detector interact with the semiconductor material which forms the semiconductor strip detector. A plurality of electrodes are connected to the semiconductor strip detect or such that each one of the of semiconductor strip detector segments has at least one of the of electrodes coupled thereto. A signal processor is also coupled to each one of the electrodes. The present detector detects an interaction within the semiconductor strip detector, between an x-ray and the semiconductor material, and also indicates the depth of penetration of the x-ray into the semiconductor strip detector at the time of the interaction.

12 Claims, 3 Drawing Sheets

| E (keV) | 20 | 30 | 40 | 50 | 60 | 80 |
|---|---|---|---|---|---|---|
| λ (cm) | 0.095 | 0.31 | 0.625 | 1.0 | 1.43 | 2.0 |

HIGH RESOLUTION ENERGY-SENSITIVE DIGITAL X-RAY

GOVERNMENT RIGHTS

The United States Government has rights in this invention pursuant to Contract No. DE-AC03-76SF00098 between the United States Department of Energy and the University of California.

TECHNICAL FIELD

The present invention relates to the field of x-ray detection and, more specifically, to x-ray detection using semiconductor strip detectors.

BACKGROUND OF THE INVENTION

Most prior art "digital" radiography techniques do not provide truly digital images. The quotes are added here to indicate that most prior art techniques are basically analog and integrative in nature, with digitization occurring at the last step. A first prior art radiography technique uses a phosphor x-ray detector with an image intensifier, followed by very fast optics and a television camera and is referred to as (PIITV). A second prior art radiography technique is "photostimulable phosphor computer radiography" (PPCR). However, both of these prior art radiography techniques suffer from severe drawbacks.

In the PIITV radiography technique, intensifier devices are required. These image intensifier devices are as much as 30–40 cm in diameter and are very expensive. Additionally, the TV cameras used in the PIITV technique are not capable of resolutions greater than approximately 1000 lines. Furthermore, the image intensifier/TV system has intrinsic noise that degrades image quality at low doses.

In the PPCR radiography approach a storage phosphor screen is used. Minute crystals of, for example, $BaFX:Eu^{2+}$, where $X=Cl$, Br, I, in a thin layer absorb the radiation and generate a latent image in trapped energy states. Image development is accomplished by scanning the exposed plate with an infrared laser beam (He-Ne), producing photostimulated luminescence in the UV range. The laser scans the exposed plate with a spot having a 100 $\mu$m diameter size. The UV light is collected with a light guide and detected with a high-sensitivity photomultiplier tube. Digitization of the photomultiplier signal is followed by extensive processing to produce the image. The scan takes a rather long time, on the order of a minute or more, which imposes a limitation in some circumstances.

Additionally, PPCR has a very high dynamic range in principle, but has been limited in practice to about 10 bits. The largest image size is about 2048 pixels. Nevertheless, the PPCR approach, as with the PIITV approach, does not fall into the category of true digital radiography.

Recently methods, such as those disclosed in U.S. Pat. No. 4,937,453 to Nelson, have been proposed to take advantage of advances in semiconductor technology. The Nelson reference discusses a variety of stacking, edge-on, and drift-device configurations that serve to increase the x-ray stopping power of semiconductors. Stopping power is an important issue for a low Z material such as silicon. However, the Nelson reference does not address the issue of digital versus analog signal processing.

True digital radiography produces an immediate digital signal based upon the interaction of an x-ray with a detector. That is, no intermediate steps such as the laser scanning of a phosphor screen are required to achieve a digital signal. Although such methods provide certain improvements over "non-digital" radiography techniques, the methods cited in the Nelson reference only detect the interaction between an x-ray and the material which forms the detector on which the x-ray is incident. In so doing, the Nelson device does not quantify or extract beneficial information contained in each interacting x-ray. Specifically, the differing energies of each of the interacting x-rays are not quantified by the Nelson reference.

Thus, many prior art radiography techniques do not provide true digital x-ray detection. Additionally, prior art methods which do provide true digital x-ray detection, are unable to extract valuable considerable energy information contained within each interacting x-ray.

Consequently, a need exists for radiography technique which is truly digital, and which is able to extract and quantify valuable energy information contained within each interacting x-ray.

SUMMARY OF THE INVENTION

It is therefore an object of the present invention to provide a truly digital detector which is simultaneously able to quantify and extract energy and position information contained within each interacting x-ray. This object has been accomplished using a semiconductor strip detector which is formed of a plurality of segments, thereby taking advantage of the very strong variation of x-ray penetration depth with x-ray energy.

Each of the segments of the semiconductor strip detector is formed of semiconductor material. The segments are coupled together in a collinear arrangement so that the semiconductor strip detector has a length great enough such that substantially all of the x-rays incident on the front edge of the semiconductor strip detector interact with the semiconductor material which forms the segmented semiconductor strip detector. A plurality of electrical connectors are connected to the semiconductor strip detector with each one of the semiconductor strip detecter segments having at least one of the of electrical connectors coupled thereto. A signal processor is also coupled to each one of the electrical connectors. In this configuration, electrical circuit design advantages are realized which permit each interacting x-ray to be detected and counted digitally with an efficiency approaching unity. In so doing, the present claimed invention not only detects an interaction within the semiconductor strip detector between an x-ray and the semiconductor material in a truly digital manner, but also indicates the depth of penetration of the x-ray into the semiconductor strip detector at the time of the interaction. Thus, the energy of each interacting x-ray can be quantified based upon the depth of penetration of the x-ray into the segmented semiconductor strip detector.

BRIEF DESCRIPTION OF THE DRAWINGS

The accompanying drawings which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figures 1, 3:
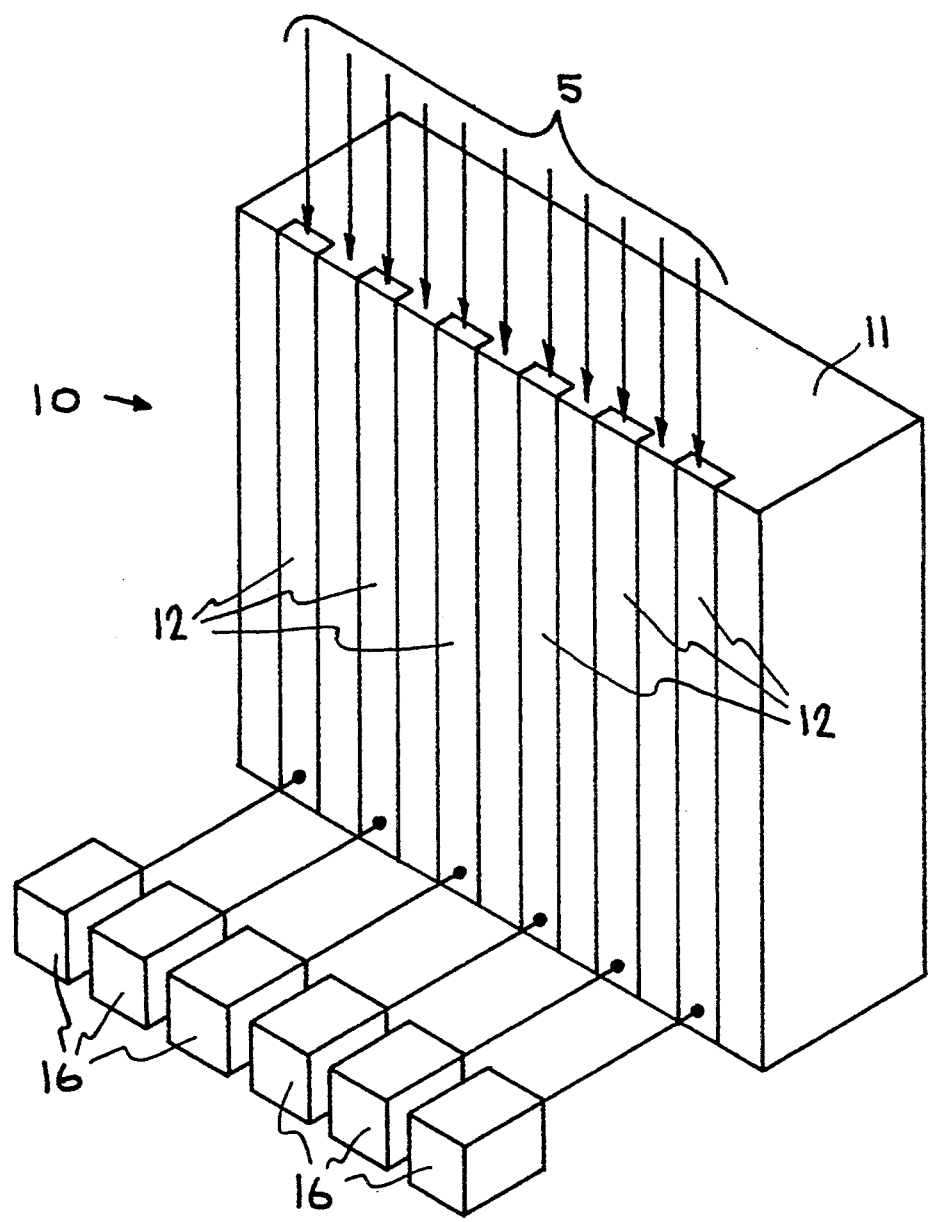
FIG. 1 is a perspective view of a Prior Art x-ray detector.
FIG. 3 is a table giving data for x-ray attenuation in silicon at various x-ray energies in accordance with the present claimed invention.

With reference now to Prior Art FIG. 1, a perspective view of a Prior Art x-ray detector 10 is shown. Conductive strips 12 collect charges generated as x-rays, typically shown as 5, enter top edge 11 of detector 10, penetrate at least partially through detector 10, and interact with the semiconductor material which forms detector 10. The charges collected by conductive strips 12 are analyzed by circuitry schematically shown as 16.

With reference still to FIG. 1, although the Prior Art detector is able to record the occurrence of interactions between x-rays and the material forming detector 10, Prior Art detector 10 does not quantitatively indicate the depth of penetration of x-rays into detector 10. That is, conductive strips 12 only indicate that an interaction has occurred somewhere within detector 10. The interaction may have occurred very near top edge 11 of detector 10, or may have occurred just before the x-ray reached the bottom edge of detector 10.

Figure 2:
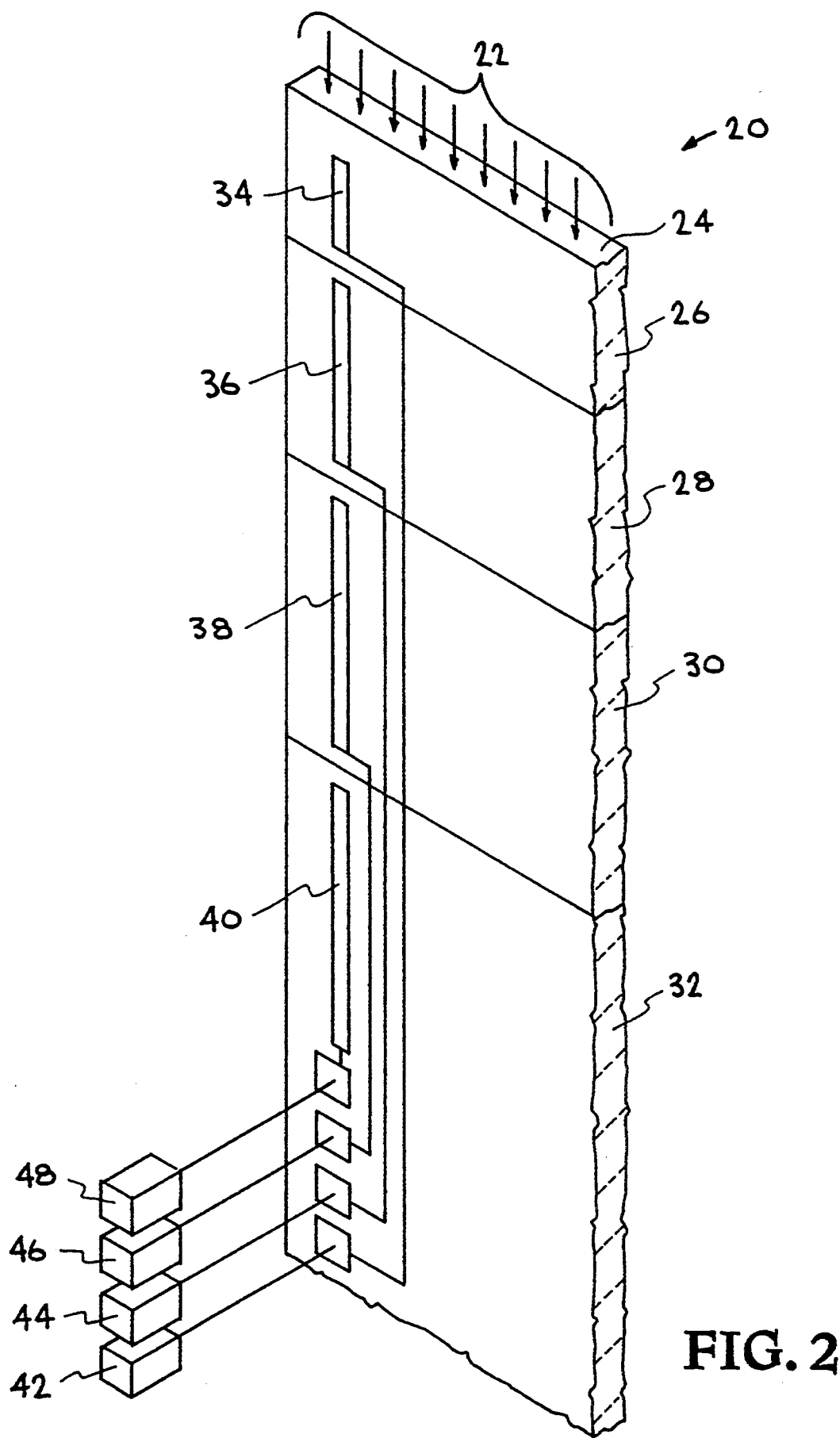
FIG. 2 is a perspective view of a segmented semiconductor strip detecter in accordance with the present claimed invention.

With reference now to FIG. 2, a segmented semiconductor strip detector 20 in accordance with one embodiment of the present claimed invention is shown. Segmented semiconductor strip detector 20 is arranged in an "edge-on" orientation towards an x-ray source, not shown. That is, segmented semiconductor strip detector 20 has an edge 24 arranged such that x-rays, typically shown as 22, emitted from the x-ray source are incident upon and substantially perpendicular to edge 24. In so doing, x-rays 22 incident upon edge 24 pass through edge 24, into segmented semiconductor strip detector 20, and continue to travel through segmented semiconductor strip detector 20 in a direction perpendicular to the surface of edge 24. Therefore, x-rays 22 will pass through segmented semiconductor strip detector 20 until the x-rays 22 interact with the semiconductor material which forms segmented semiconductor strip detector 20. Although segmented semiconductor strip detector 20 is formed using silicon in the present embodiment, the present claimed invention is also well suited to the use of other semiconductor materials.

Referring again to FIG. 2, segmented semiconductor strip detector 20 is formed of four discrete segments 26, 28, 30, and 32. In the present embodiment segmentation of strip detector 20 is achieved by lithographic subdivision of a monolithic strip detector into four discrete segments 26, 28, 30, and 32. However, the present claimed invention is also well suited to alternate methods of segmentation. Additionally, although four segments 26, 28, 30, and 32 are used in the present embodiment, segmented semiconductor strip detector 20 of the present claimed invention is also well suited to various other numbers of segments. In particular, the utilization of a large number of segments offers a means to reduce or eliminate parallax errors, such that the distance of the detector from the x-ray source can be varied at will and accounted for in image reconstruction.

With reference still to FIG. 2, in the present embodiment, silicon segmented strip detector is approximately 0.3 mm thick and about 60 mm long. The active strip length is 45 mm, segmented in four parts, segments 26, 28, 30, and 32 of varying lengths. Furthermore, although segments 26, 28, 30, and 32 are of varying lengths and are arranged in order of increasing length, with the shortest of segments 26, 28, 30, and 32 disposed closest to the x-ray source, not shown, and the longest of segments 26, 28, 30, and 32 disposed farthest from the x-ray source, not shown, the present claimed invention is also well suited to shorter or long silicon segmented strip detectors, to segments having the same length, and any of the numerous alternate arrangements of segments having varying lengths. The lengths of segments 26, 28, 30, and 32 may be chosen to optimize the statistical significance that each segment 26, 28, 30, and 32 contributes in the reconstruction of the incident energy spectrum for each sample.

With reference still to FIG. 2, each of segments 26, 28, 30, and 32 have a strip electrode 34, 36, 38, and 40, respectively, attached thereto. Strip electrodes 34, 36, 38, and 40 are only coupled to their respective segments. That is, strip electrode 34 will only detect charges generated within segment 26, strip electrode 36 will only detect charges generated within segment 28, strip electrode 38 will only detect charges generated within segment 30, and strip electrode 40 will only detect charges generated within segment 32. It will be obvious to those of ordinary skill in the art, that the number of strip electrodes may be altered to accommodate variations in the number of segments, or that the type, shape or number of electrodes per segment may be altered to accommodate design purposes. In particular, the distance between segments 26, 28, 30, and 32 and the signal processing electronics may be made extremely small, essentially negligible, by modern interconnect technology such as wire-bonding, bump-bonding, or similar multi-chip module technology. This has the advantage of minimizing input capacitance to the signal processing electronics, which, in turn, leads to lower electronics noise. Realization of the lower electronics noise permits an energy threshold for counting x-rays interactions at a level far below typical energy loss.

Referring again to FIG. 2, signal processors 42, 44, 46, and 48 are coupled to a strip electrode 34, 36, 38, and 40, respectively, to receive and process signals detected by their respective electrodes. In so doing, the present claimed invention quantitatively identifies the segment into which an x-ray, incident to segmented strip detector 20, has penetrated at the time of an interaction between the incident x-ray and the silicon which forms segmented strip detector 20.

With reference again to FIG. 2, more specifically, in most radiography fields, and especially human x-ray diagnostic radiography, the energy region of interest for incident x-rays 22 is roughly from 20 to 100 KeV. At the point of interaction, an x-ray 22 in this range deposits energy into silicon segmented strip detector 20 mainly in the following two ways. First, an x-ray 22 may deposit energy via the Atomic Photo-effect. In the atomic photo-effect, an x-ray 22 is entirely absorbed by an atom such as for example a silicon atom, resulting in the ejection of one or more electrons, and possibly a few additional very low energy x-rays reflecting the shell structure of atomic silicon. These secondary x-rays are typically absorbed very close the point of emission. The photo-effect is most dominant at lower energies.

With reference still to FIG. 2, a second way in which an x-ray 22 deposits energy into silicon segmented strip detector 20 is through Compton Scattering. In Compton scattering, x-ray is scattered by a collision with an atomic electron, thereby depositing a fraction of its energy. The scattered x-ray continues at a lower energy in a different direction (collisions with small fractional energy loss result in smaller deflections). Compton scattering is more important at high energies. The scattered x-ray is unlikely to be detected in subsequent interactions since it most probably will leave the sensitive volume of silicon segmented strip detector 20. In addition to these two ways, a coherent elastic scattering process also occurs, but with a much smaller probability, and, furthermore, the deposited energy in these incoherent scatters is undetectable by any practical method. Because of the existence of two significant interaction mechanisms, atomic photo-effect and Compton scattering, measurement of deposited energy suffers from intrinsically poor resolution since the Compton process may deposit an energy fraction that varies from zero to one. Therefore, the measurement of energy by penetration depth is independent of which interaction mechanism occurs. Each x-ray photon is given uniform weight for subsequent image processing.

Referring still to FIG. 2, In the present embodiment, silicon segmented strip detector 20 is arranged in an edge-on orientation towards an x-ray source, not shown. X-rays 22 are then incident on and substantially perpendicular to front edge 24. X-rays 22 then pass through edge 24 and into detector 20 and proceed therethrough along a path substantially parallel to strip electrodes 34, 36, 38, and 40 until they interact either by atomic photo-effect or by Compton scattering with the silicon material which forms segmented detector 20. Strip electrodes 34, 36, 38, and 40 detect signals generated by the interaction of x-rays 22 with the silicon material forming segmented strip detector 20. Signal processors 42, 44, 46, and 48 then process the received signals as desired. Because each segment 26, 28, 30, and 32 has a separate strip electrode 34, 36, 38, and 40, respectively, and processor 42, 44, 46, and 48, respectively, attached thereto, the present claimed invention is able to precisely identify the segment in which the interaction occurred, and thereby quantitatively determine the penetration depth of the x-ray into segmented strip detector 20 at the time of the interaction.

With reference still to FIG. 2, the conversion of interacting x-rays 22 to an electrical signal in segments 26, 28, 30, and 32 is accomplished with low-noise integrated circuitry. Because of the segmentation of silicon segmented strip detector 20 and optimization of the circuitry, noise $\sigma$ is expected to be not more than 200 electrons, rms. Assuming reasonable uniformity among channels, at four to six $\sigma$ threshold essentially no noise counts would occur; this corresponds to an energy threshold of about 3–4 KeV. Each x-ray 22 is counted separately, as long as it deposits energy above this threshold. The threshold can thus be made sufficiently low such that essentially all interactions in each segment 26, 28, 30, and 32 of silicon segmented strip detector 20 are counted, but noise signals are not counted. Because the energy threshold for all segments 26, 28, 30, and 32 is small compared with probable energy losses, natural circuit manufacturing techniques causing variations between segment thresholds will have an inconsequential effect. This eases the signal processing design.

With reference still to FIG. 2, several substantial benefits over prior art x-ray detection devices are realized by the present claimed invention. It is well known that useful imaging information can be obtained by taking advantage of the fact that x-ray absorption varies strongly on both x-ray energy and atomic number Z. In the lower part of the x-ray energy interval of interest (20–100 KeV), the predominant x-ray interaction with the silicon of segmented strip detector 20 is by the photo-effect. The interaction probability falls very rapidly with energy at the rate of approximately $E^{-3}$. The rising probability for Compton scattering causes a flattening at higher energies. Shell edge effects introduce steps in the interaction probability for higher Z materials. In other words, the distribution of interaction points within silicon segmented strip detector 20 for an incident x-ray beam of any given energy, depends only on the intrinsic properties of silicon segmented strip detector 20. Thus, the position of interaction of the x-ray with the silicon of segmented strip detector 20 has considerable energy information. While not a direct energy measurement, the extremely rapid variation of attenuation length with energy implies that the spatial distribution of interaction points can be converted to obtain a useful energy spectrum.

Direct energy measurements are complicated by signal sharing between neighboring detection elements, and by the escape of energy in Compton scattering, a predominant process at higher energies. Perturbative effects of the signal processing electronics due to natural discriminator energy threshold variations, etc., introduce serious errors in the observed energy spectrum, placing very strict requirements on electronic stability and uniformity for a direct energy measurement. These concerns suggest the value of an indirect energy measurement based on the spatial distribution of interaction points.

Referring again to FIG. 2, in order to obtain a useful spatial distribution of interaction points, it is essential to use a detection medium in which this spectrum is distributed over a convenient scale. This suggests the use of relatively low-Z detector in which the attenuation length is comparatively large. Thus, silicon is used as the material for segmented strip detector 20 in the present embodiment of the present claimed invention. The x-ray interaction probability is $E^{-2.8}$ at energies less than approximately 50 KeV in silicon segmented strip detector 20. Between 20 KeV and 50 KeV, the interaction probability falls by more than an order of magnitude. Above 50 KeV, the interaction probability in silicon segmented strip detector 20 becomes gradually less energy dependent, but is still falling at 100 KeV.

With reference now to FIG. 3, a table giving data for x-ray attenuation in silicon at various x-ray energies is shown. For the energy ranges listed in FIG. 3, there are no shell edge structure effects in silicon. Because x-rays 22 of FIG. 2 are detected within silicon segmented strip detector 20 of FIG. 2 in a edge-on orientation to intercept x-rays 22 of FIG. 2 a large apparent thickness is presented to the incident x-rays 22 of FIG. 2. Thus, silicon segmented strip detector 20 of FIG. 2 provides a detection efficiency of nearly unity over most of the interesting energy range (20–100 KeV), and also provides a conveniently large physical extent to measure the interaction position spectrum. As can be seen from the table of FIG. 3, The probability for an x-ray to escape silicon segmented strip detector 20 of FIG. 2 falls off exponentially with the thickness of silicon segmented strip detector 20. For example, the probability of interaction of an x-ray with an energy of 30 KeV traveling through 3 mm of silicon is about 63%. Additionally, in silicon, the range of a 10 KeV electron is less than 2 $\mu$m, calculated in a continuous slowing down approximation. The effective range will grow rapidly with increasing energy, but should not exceed about 65 $\mu$m even at 100 KeV. Thus the energy deposited by the x-ray interaction is contained in small volume connected to the point of interaction. The energetic secondary electrons lose energy in further scatterings with the silicon substrate, creating ionization in a well-known way. On average, about 3.3 eV are expended in the creation of an electron-hole pair. Thus, a 33 KeV x-ray will create an ionization sample of about 10,000 pairs, or 1.67 fC.

Referring again to FIG. 2, in the present embodiment of the present claimed invention segments 26, 28, 30, and 32 are formed having varying lengths. The lengths of segments 26, 28, 30, and 32 in the present embodiment are chosen to optimize the sensitivity of silicon to different x-ray energies. That is, first segment 26 will be quite short, and last segment 32 will be relatively long. As mentioned above, the number of segments in the present embodiment is taken to be four although different numbers may also be used.

An incident x-ray beam of a given energy and "unit" intensity for an appropriate counting interval will result in a set of numbers, $N_i$, reflecting the number of counts in segment i, where the index i refers to the number of segments. Repeating this process for j different x-ray energies will yield a matrix of numbers $M_{ij}$. Letting $S_j$ represent the incident energy spectrum after traversing an absorber, the counts observed will be given by (neglecting normalization)

$$C_i = M_{ij}S \quad (1)$$

M can be generated for a given system by theoretical calculations using the geometry of silicon segmented detector 20 of FIG. 2, silicon attenuation data, and the x-ray source energy spectrum. Once generated, M is extremely stable. The rapid variation of the attenuation length with energy will ensure that the inverse of M is well-behaved. Once M is inverted, energy dependent information integral to the interacting x-rays can be extracted:

$$E = M^{-1}C \quad (2)$$

Thus, using the silicon segmented strip detector 20 of FIG. 2, energy dependent information contained in the vector E can be manipulated to emphasize soft or bony tissues for image presentation. In addition to the matrix approach given above to extract energy information, other methods also exist for maximizing computational efficiency. Simpler methods such as least squares fitting to the segment data also provide a robust technique for the extraction of energy information. In so doing, substantial beneficial information may be obtained using the present claimed invention. Therefore, diagnostic performance in, for example, human x-ray radiography will be substantially enhanced in most applications. For example, because calcium has a very different energy dependent interaction probability relative to soft tissue, microcalcifications in mammography will be easier to identify using silicon segmented strip detector 20 of FIG. 2 of the present claimed invention.

Figure 4:
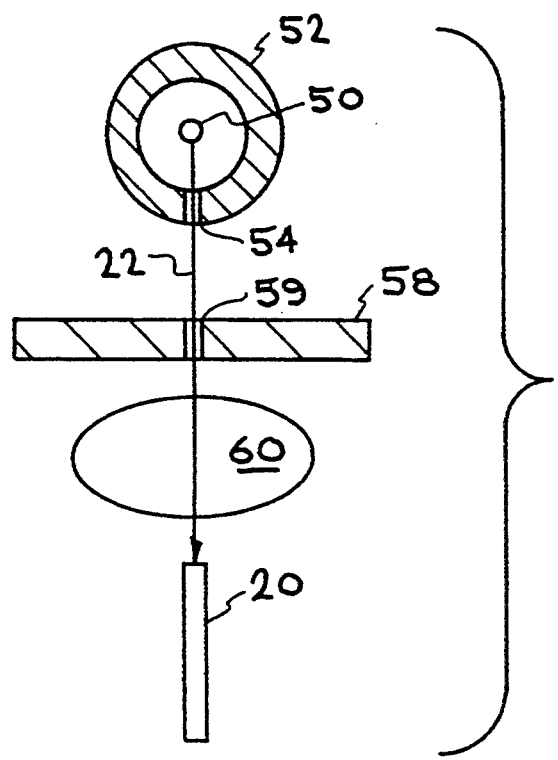
FIG. 4 is a schematic view of a segmented strip detector x-ray detection system in accordance with the present claimed invention.

With reference now to FIG. 4, a schematic view of a segmented strip detector x-ray detection system in accordance with one embodiment of the present claimed invention is shown. As shown in FIG. 4, an x-ray source 50 is surrounded or shielded by a shield 52. Shield 52 has an opening 54 formed therethrough to emit a single beam of x-rays 22 therefrom. A collimator 58 having a slit 59 formed therethrough directs a collimated beam of x-rays 22 at a source 60 which is to be x-rayed. Segmented strip detector 20, shown in detail in FIG. 2, is arranged in an edge-on orientation towards x-ray source 50. Segmented strip detector 20 is used to detect and process x-rays 22 which pass through source 60.

Figure 5:
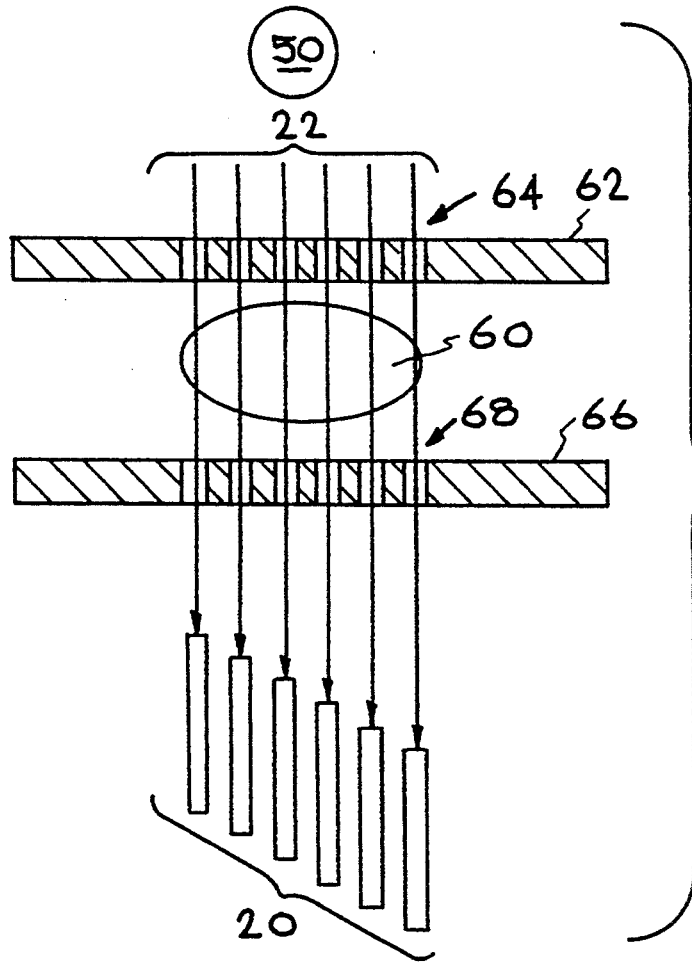
FIG. 5 is a schematic view of a plurality of semiconductor strip detectors arranged in close proximity to each other to form an x-ray detector which covers a larger area in accordance with the present claimed invention.

Referring now to FIG. 5, a schematic view of another embodiment of the present claimed invention is shown in which a plurality of semiconductor strip detectors 20 are arranged in close proximity to each other to form an x-ray detector which covers a larger area. As shown in FIG. 5, an x-ray source 50 emit a beam of x-rays 22 therefrom. A first collimator 62 having slits typically shown as 64 formed therethrough direct a collimated beam of x-rays 22 at a source 60 which is to be x-rayed. X-rays 22 which pass through source 60 pass through a second collimator 66 having slit typically shown as 68 formed therethrough. A plurality of segmented strip detectors 20 are arranged in an edge-on orientation towards x-ray source 50. The plurality of segmented strip detectors 20 are used to detect and process x-rays 22 which pass through source 60. Although two collimators 62 and 66 are shown on either side of a source 60 in the present embodiment of the present claimed invention, the present claimed invention is also well suited to the use of various other numbers of collimators, and various other configurations. It will also be apparent to those of ordinary skill in the art the number of segmented semiconductor strip detectors may be varied.

With reference still to FIG. 5, the plurality of segmented semiconductor strip detectors 20 have an interstrip spacing of approximately 0.085 mm. Thus, for a combined segmented semiconductor detector width of 43 mm, 512 segmented semiconductor detector strips would be required. Eight detectors of this size would span 344 mm, producing an x-ray image of reasonable width (4096 pixels). It will be apparent to those of ordinary skill in the art, that larger array sizes are straightforward extrapolations.

With reference still to FIG. 5, the segmented semiconductor strip detectors 20 of the present embodiment are arranged in a "staircased" or staggered configuration. In so doing, the present embodiment allows for convenient electrical connection between the processors, not shown, and the strip electrodes, not shown, which are present on each of the segmented semiconductor strip detectors 20. Although such a staircased or staggered configuration is used in the present embodiment, the present claimed invention is also well suited to the use of various other segmented semiconductor strip detector configurations.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention to defined by the claims appended hereto and their equivalents.

I claim:

1. A semiconductor x-ray detector comprising:

at least one semiconductor strip detector each semiconductor strip detector disposed in an edge-on orientation towards an x-ray source such that x-rays from said x-ray source are incident upon and substantially perpendicular to a front edge of said semiconductor strip detector, said semiconductor strip detector comprised of semiconductor material, said semiconductor strip detector further comprised of;

at least three semiconductor strip detector segments having varying lengths, said segments of varying lengths coupled together in a collinear arrangement to form said semiconductor strip detector with a length great enough such that substantially all of said x-rays incident on said front edge of said semiconductor strip detector interact with said semiconductor material within said semiconductor strip detector, said at least three semiconductor strip detector segments of varying lengths disposed in order of length, with the shortest of said semiconductor strip detector segments of varying lengths disposed closest to said x-ray source and the longest of said semiconductor strip detector segments of varying lengths disposed farthest from said x-ray source, a plurality of electrodes, said plurality of electrodes connected to only one surface of said semiconductor strip detector such that each one of said plurality of semiconductor strip detector segments of varying lengths has at least one of said plurality of electrodes coupled to only one surface thereof, and a signal processor coupled to each of said plurality of electrodes.

2. The semiconductor x-ray detector of claim 1 wherein a plurality of said semiconductor strip detectors are disposed in said edge-on orientation towards said x-ray source, said plurality of semiconductor strip detectors disposed in close proximity to each other.

3. The semiconductor x-ray detector of claim 2 wherein said plurality of semiconductor strip detectors disposed in said edge-on orientation are arranged in a staircased configuration such that each of said plurality of semiconductor strip detectors is located progressively farther from said x-ray source.

4. A semiconductor x-ray detector comprising:

at least one semiconductor strip detector, each semiconductor strip detector disposed in an edge-on orientation towards an x-ray source such that x-rays from said x-ray source are incident upon and substantially perpendicular to a front edge of said semiconductor strip detector, said semiconductor strip detector comprised of semiconductor material, said semiconductor strip detector further comprised of;

semiconductor segment means for indicating the depth into said semiconductor strip detector at which said x-rays interact with said semiconductor material, said semiconductor segment means comprised of at least three semiconductor segments of varying lengths such that the statistical significance of each of said at least three semiconductor segments of varying lengths is optimized, said at least three semiconductor segments of varying lengths arranged in order of length, with the shortest of said at least three semiconductor segments of varying lengths disposed closest to said x-ray source and the longest of said at least three semiconductor segments of varying lengths disposed farthest from said x-ray source, a plurality of electrical connection means for receiving electrical signals generated within said semiconductor strip detector as said x-rays interact with said semiconductor material, each of said plurality of electrical connection means coupled to only one surface of semiconductor strip detector such that each one of said at least three semiconductor segments of varying lengths has at least one of said plurality of electrical connection means coupled to only one surface thereof, and a signal processor coupled to each of said plurality of electrical connection means.

5. The semiconductor x-ray detector of claim 4 wherein a plurality of said semiconductor strip detectors are disposed in said edge-on orientation towards said x-ray source, said plurality of semiconductor strip detectors disposed in close proximity to each other.

6. The semiconductor x-ray detector of claim 5 wherein said plurality of semiconductor strip detectors disposed in said edge-on orientation are arranged in a staircased configuration such that each of said plurality of semiconductor strip detectors are located progressively farther from said x-ray source.

7. A method for detecting the depth of penetration of an interacting x-ray into at least one semiconductor strip detector comprising the steps of:

forming at least three semiconductor segments having varying lengths into a semiconductor strip detector formed of semiconductor material such that said semiconductor strip detector is comprised of said at least three semiconductor segments of varying lengths disposed in a collinear configuration and arranged in a single row, arranging said segmented semiconductor strip detector in an edge-on orientation towards an x-ray source such that each one of said at least three semiconductor segments of varying lengths is disposed at a different distance from said x-ray source with the shortest of said at least three semiconductor segments of varying lengths disposed closest to said x-ray source and the longest of said at least three semiconductor segments of varying lengths disposed farthest from said x-ray source and such that x-rays which are incident upon a front edge of said segmented semiconductor strip detector and do not interact with said semiconductor material of the semiconductor segment arranged closest to said x-ray source will continue to pass through the remaining said at least three semiconductor segments of varying lengths located progressively farther from said x-ray source until said x-ray interacts with said semiconductor material of one of said at least three semiconductor segments of varying lengths, coupling an electrode to only one surface of each one of said at least three semiconductor segments of varying lengths such that electrical signals generated within said at least three semiconductor segments of varying lengths as said x-rays interact with said semiconductor material are detected, and processing said electrical signals detected by said electrodes such that the exact one of said at least three semiconductor segments of varying lengths in which said x-ray interacts is identified and such that the depth of penetration of said x-ray into said segmented semiconductor strip detector is determined.

8. The method as recited in claim 7 further comprising the steps of:

arranging a plurality of said segmented semiconductor strip detectors in said edge-on orientation towards said x-ray source such that said plurality of segmented semiconductor strip detectors are disposed in close proximity to each other, coupling an electrode to each one of said at least three semiconductor segments of varying lengths on each of said plurality of segmented semiconductor strip detectors such that electrical signals generated within said at least three semiconductor segments of varying lengths of said plurality of segmented semiconductor strip detectors as said x-rays interact with said semiconductor material are detected, and processing said electrical signals detected by said electrodes such that the exact one of said at least three semiconductor segments of varying lengths in said plurality of segmented semiconductor strip detectors in which said x-ray interacts is identified and such that the depth of penetration of said x-ray into said plurality of segmented semiconductor strip detectors is determined.

9. The method as recited in claim 8, wherein the step of arranging said plurality of segmented semiconductor strip detectors in said edge-on orientation towards said x-ray source further comprises the step of:

arranging said plurality of segmented semiconductor strip detectors in a staircased configuration such that each of said plurality of segmented semiconductor strip detectors are located progressively farther from said x-ray source.

10. A system for the detection of x-rays comprising:
an x-ray source, at least one semiconductor strip detector, each semiconductor strip detector disposed in an edge-on orientation towards said x-ray source such that x-rays from said x-ray source are incident upon and substantially perpendicular to a front edge of said semiconductor strip detector, said semiconductor strip detector comprised of semiconductor material, said semiconductor strip detector further comprised of;

at least three semiconductor strip detector segments, said segments coupled together in a collinear arrangement to form said semiconductor strip detector with a length great enough such that substantially all of said x-rays incident on said front edge of said semiconductor strip detector interact with said semiconductor material within said semiconductor strip detector, said at least three segments having varying lengths and arranged in order of length from shortest to longest with the shortest of said at least three segments of varying length disposed closest to said x-ray source and the longest of said at least three segments of varying lengths disposed farthest from said x-ray source such that the statistical significance of each of said at least three segments of varying length is optimized, a plurality of electrodes, said plurality of electrodes connected to only one surface of said semiconductor strip detector such that only one surface of each one of said at least three segments of varying lengths has at least one of said plurality of electrodes coupled thereto, and processing means coupled to each of said plurality of electrodes for processing signals generated within said at least three segments of varying lengths by said interaction of said x-rays with said semiconductor material of said at least three segments of varying lengths.

11. The x-ray detection system of claim 10 wherein a plurality of said semiconductor strip detectors are disposed in said edge-on orientation towards said x-ray source, said plurality of semiconductor strip detectors disposed in close proximity to each other.

12. The x-ray detection system of claim 11 wherein said plurality of semiconductor strip detectors disposed in said edge-on orientation are arranged in a staircased configuration such that each of said plurality of semiconductor strip detectors are located progressively farther from said x-ray source.

* * * * *